Figure 1:
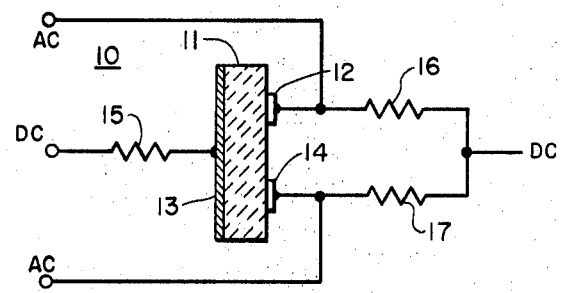

United States Patent

[11] 3,569,795

| [72] | Inventor | Emanuel Gikow |
| | | West Long Branch, N.J. |
| [21] | Appl. No. | 829,079 |
| [22] | Filed | May 29, 1969 |
| [45] | Patented | Mar. 9, 1971 |
| [73] | Assignee | the United States of America as represented by the Secretary of the Army |

[54] VOLTAGE-VARIABLE, FERROELECTRIC CAPACITOR
5 Claims, 4 Drawing Figs.

[52] U.S. Cl.................................................... 317/231, 317/238
[51] Int. Cl...................................................... H01g 1/16, H01g 9/14
[50] Field of Search............................................ 317/230, 231, 258, 238

[56] References Cited
UNITED STATES PATENTS

| 2,633,543 | 3/1953 | Hawatt........................ | 317/238X |
| 2,720,573 | 10/1955 | Lundqvist..................... | 317/238X |
| 3,426,255 | 2/1969 | Heywang....................... | 317/238 |
| 3,448,348 | 6/1969 | Stadler........................ | 317/231 |

Primary Examiner—James D. Kallam
Attorneys—Harry M. Saragovitz, Edward J. Kelly, Herbert Berl and Charles F. Gunderson ABSTRACT: This disclosure discusses voltage-variable capacitors, including ferroelectric, ceramic-dielectric capacitors that are variable by control of the potential gradients within their dielectric material. This disclosure describes voltage-variable, dielectric capacitors that have a plurality of electrodes spaced throughout the dielectric with control-voltage potentials of alternately opposing polarity to achieve a higher potential gradient within the dielectric than would be possible from a given control voltage supply to a single pair of electrodes on opposing sides of the dielectric.

PATENTED MAR 9 1971

3,569,795

INVENTOR.
EMANUEL GIKOW

BY: Charles F. Gunderson AGENT
Harry M. Saragovitz,
Edward J. Kelly & Herbert Berl
ATTORNEYS

VOLTAGE-VARIABLE, FERROELECTRIC CAPACITOR

The invention described herein may be manufactured, used and licensed by or for the Government for governmental purposes without the payment to me of any royalty thereon.

BACKGROUND OF THE INVENTION

Voltage-variable capacitors are well known, the most common being of the Varicap type which are based on a semiconductor material that exhibits a capacity across a junction. The capacity can be controlled by varying the potential of a direct-current control voltage of a given polarity across the junction. This provides a substantial control of the capacity for a given change in the direct-current, control voltage, but this control is, in turn, effected by the incoming, alternating-current signals that are, inevitably, superimposed on the direct-current, control potentials, since both be applied across the same junction. This type of voltage-variable capacitor is also limited, in that the DC control potentials must be correctly polarized with respect to the junction for effective operation.

Another type of voltage-variable capacitor is that is not sensitive to the polarity of the control voltage is the dielectric capacitor, where the capacity can be varied by controlling the dielectric constant of the material, through control of the potential gradient across the dielectric. Aside from being insensitive to the polarity of the control voltage this device uses a comparatively large DC voltage to control the capacity, which is, comparatively, less influenced by the alternating-current signal voltages applied across the capacitor.

However, this, in turn, incurs the disadvantage that for very low capacities, with correspondingly greater spacing across the dielectric between the electrodes, the control voltages needed for a given control of potential gradient must be increased to an excessive and impractical value.

It is therefore an object of this invention to provide a voltage-variable capacitor that is insensitive to the polarity of its control voltage, that uses a relatively low control voltage, and that has a relatively wide range of control of capacity for a relatively low variation in control voltage.

SUMMARY OF THE INVENTION

A ferroelectric, ceramic, dielectric, voltage-variable capacitor with a substantial spacing between its alternating-current electrodes is provided with a series of direct-current, control-voltage electrodes, that are interleaved, alternating in polarity, between the alternating-current electrodes. The direct-current, control potentials are applied, through decoupling resistors, to alternate ones of these control-voltage electrodes to provide a series of relatively high, potential gradient conditions in the dielectric material between the alternating-current electrodes. These potential-gradient conditions are of alternating, potential polarities but, since the effect of the potential gradient on the dielectric constant is not effected by polarity, the overall effect on the control of the capacity is that of an effective, control voltage many times greater than would otherwise be required for a given capacity control.

FIG. 1 shows an enlarged cross section of a direct-current, voltage-variable, dielectric capacitor 10 which has electrodes 12, 13 and 14. The alternating current signal voltage is applied across the electrodes 12 and 14. The direct-current control voltage has one potential connected, through resistors 16 and 17 to electrodes 12 and 14, and the other potential connected through resistor 15 to electrode 13. Since the polarity of the DC control-voltage potential is immaterial, it is not indicated here.

The values of the resistor resistors 16 and 17 must be high with respect to the capacitive impedance between the AC electrodes 12 and 14 to avoid changing the effective impedance. The value of all of the resistors must also be high enough to avoid interaction between the AC and DC circuits.

Figure 2:
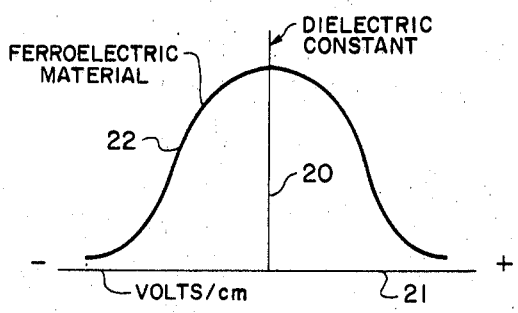

FIG. 2 is added to show the relationship between the dielectric constant of a ferroelectric material and the applied voltage gradient per centimeter across the dielectric. In FIG. 2 the ordinant 20 represents the dielectric constant, and the abscissa 21 represents the voltage gradient per centimeter. The curve 22 represents the variation in the dielectric constant with voltage gradient in a ferroelectric material, which, in turn, represents the variation in capacity between two opposing electrodes across the dielectric material.

Figure 3:
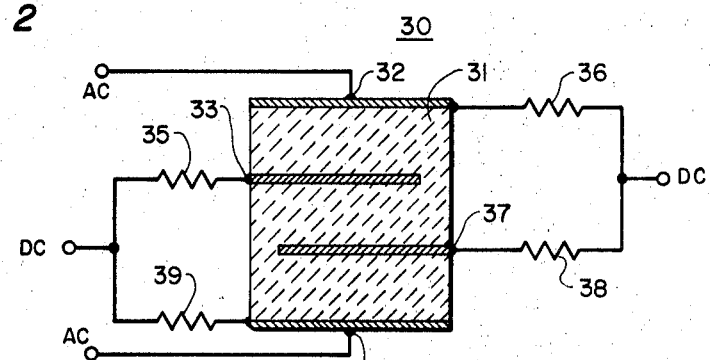

FIG. 3 shows a cross section, greatly enlarged, of another variable capacitor structure 30 that incorporates this invention. The dielectric material 31 has four electrodes 32, 33, 34 and 37. The alternating-current, signal voltage is applied across the opposing electrodes 32 and 34, but the direct-current, control voltage is applied to the electrodes alternately.

One potential of the source of DC control voltage is connected through resistor 35 and 39 to electrodes 33 and 34 respectively, while the other potential of the source of DC control voltage is connected through the resistors 36 and 38 to the electrodes 32 and 37 respectively.

The resistors are, again, chosen with a high enough value with respect to the impedance of the capacitor to have negligible effect on the AC circuit.

Figure 4:
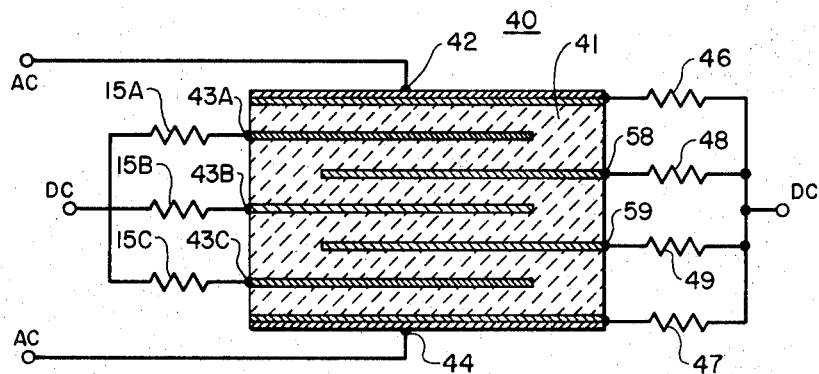

FIG. 4 illustrates a cross section of another variable-capacitor structure 40. The block of ferroelectric, ceramic, dielectric material 41 has opposing, alternating-current electrodes 42 and 44. Both of these alternating-current electrodes, and direct-current, control electrodes 58 and 59 are connected to one polarity of a source of direct-current control voltage through suitable decoupling resistors 46, 47, 48 and 49 respectively. The other polarity of the source of direct-current control voltage is connected to the electrodes 43A, 43B and 43C in the ceramic dielectric through suitable resistive means 15A, 15B and 15C respectively to provide intervals of alternate potential gradient within the dielectric.

In all of these species of voltage-variable capacitors, instead of the single, direct-current, control voltage appearing across the whole sample of dielectric material, the same voltage can now appear across small increments of the whole sample. The geometry of the electrodes causes the relatively high potential gradient to appear, at each interval or increment, to provide very much greater potential gradient per unit of thickness within the dielectric.

Although the potential gradients alternate in polarity, as has been noted earlier, the voltage control of the capacity of one of these ceramic dielectrics is that to be expected for the maximum dielectric constant since the control of capacity is not sensitive to voltage polarity. For this reason, no specific polarity of the voltage applied across the DC electrodes of any of these voltage-variable capacitors is indicated.

Any source of direct current of sufficient voltage level, that is variable over a suitable range, may be connected to the DC electrodes and used to control the value of the capacity.

This variable capacity can be connected wherever needed in any circuit that requires a variable capacity of the specific capacity range and voltage rating of this particular unit.

While only a few electrodes of alternating polarity have been shown, and the number is minimized for clarity, it should be obvious to one skilled in the art that almost any number of terminals can e be used and that they can be spaced more closely together, or further apart, depending on the direct-current control voltage available and the amount of control of capacity that is required. This in turn depends on the capacity that is needed and the closeness of the spacing of the terminals 42 and 44 to achieve that capacity. While only a few of the possible geometries of positioning of the alternate electrodes are shown here, it should be obvious to one skilled in the art that other geometries that will provide alternate positioning of electrodes are also within the scope of this concept, and would also be applicable here.

All of the species that are shown here have the DC control voltage connected to the AC electrodes. This is not necessary since the DC electrodes may be entirely separate from the AC electrodes. The DC and AC electrodes may also have other geometries and orientations with respect to each other to achieve varying degrees of potential gradient within the dielectric material as well as electrical separation.

It should be particularly noted that printed circuit techniques for forming capacitors, as well as integrated circuit techniques would be ideally suited to this device since the resistive elements can also be formed on the basic substrate. The electrodes and resistors can be directly plated on the ceramic and the resistors can be spiraled for additional inductive decoupling of the alternating current signals.

Typical materials for use as the dielectric include Lead Strontium Titanate with a dielectric constant of 3,055 and a variation of dielectric constant with voltage of 2.3 to 1 for 100 volts/mil potential gradient.

I claim:

1. A voltage-variable capacitor comprising a ferroelectric, ceramic, dielectric material having a pair of opposing electrodes; at least one additional electrode spaced between said pair of opposing electrodes; means for connecting one polarity of a source of control voltage to alternate ones of said electrodes; means for connecting the other polarity of said source of control voltage to the ones of said electrodes between said alternate ones of said electrodes; and means for connecting said opposing electrodes into an AC circuit as a capacitive element.

2. In a voltage-variable capacitor as in claim 1, said electrodes connected to said one polarity of a said source of control voltage interleaving said electrodes connected to said other polarity of said source of control voltage.

3. In a voltage-variable capacitor as in claim 1, said means for connecting said one polarity and said other polarity of said source of control voltage to said electrodes including resistors having a high resistive value with respect to the AC impedance between said opposing terminal in said circuit.

4. In a voltage-variable capacitor as in claim 1, said additional electrodes being spaced at regular intervals, sequentially, between said opposing electrodes.

5. In a voltage-variable capacitor as in claim 4, said one polarity of said source of control voltage being connected to the even electrode of said sequence and said other polarity of said source of control voltage being connected to the odd electrodes of said sequence.